J. W. ANDERSON.
FLUID OPERATED CONTROLLING MECHANISM.
APPLICATION FILED NOV. 30, 1908.
959,417.  Patented May 24, 1910.
2 SHEETS—SHEET 1.
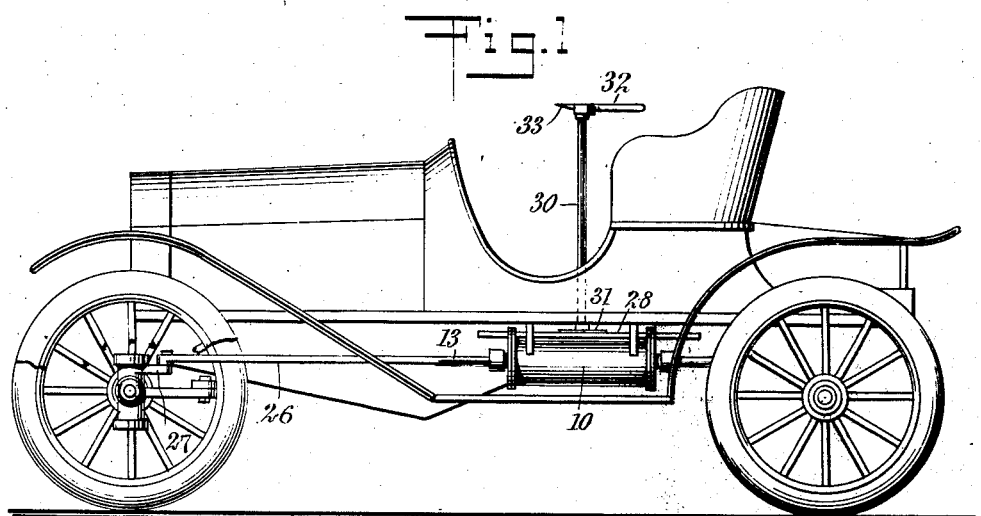
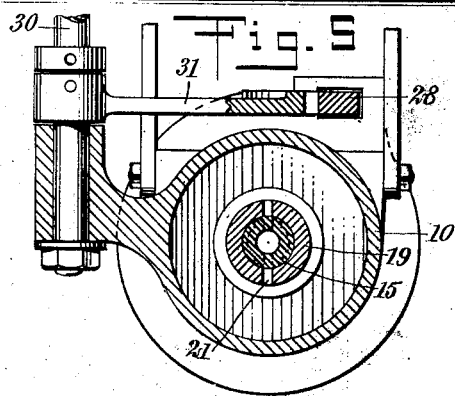
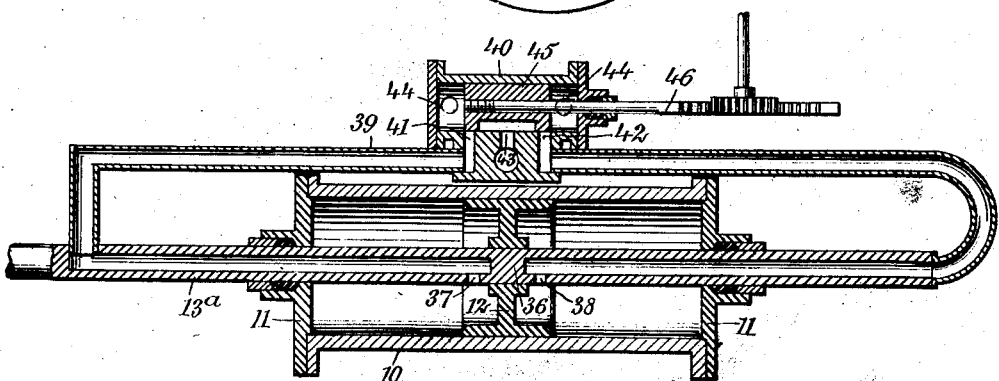
WITNESSES
INVENTOR
John Wesley Anderson
BY
ATTORNEYS J. W. ANDERSON.
FLUID OPERATED CONTROLLING MECHANISM.
APPLICATION FILED NOV. 30, 1908.
959,417.
Patented May 24, 1910.
2 SHEETS—SHEET 2.
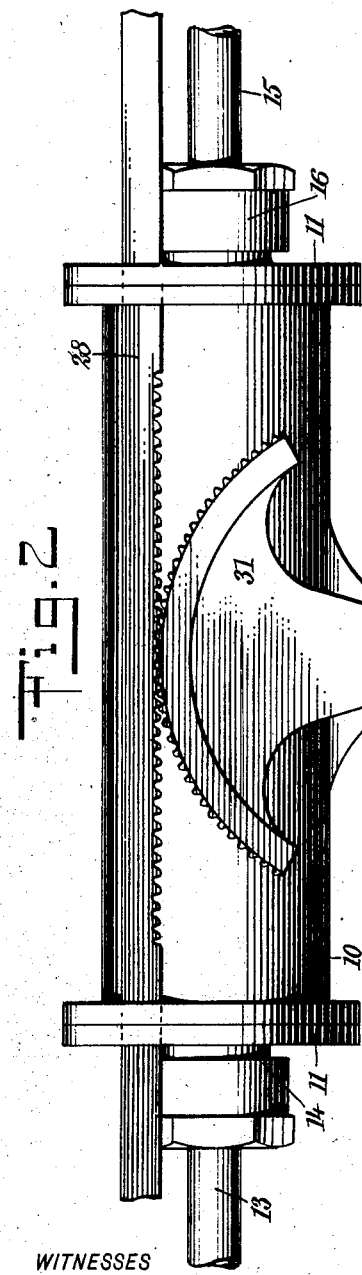
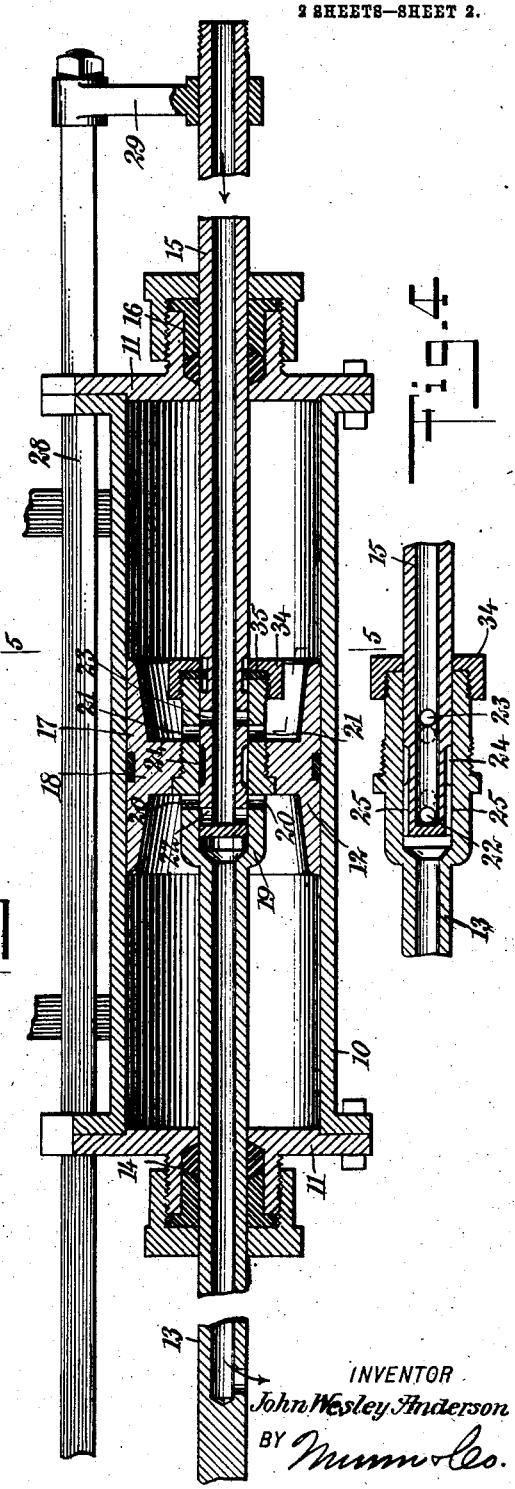
WITNESSES
INVENTOR
John Wesley Anderson
BY
ATTORNEYS

UNITED STATES PATENT OFFICE.

JOHN W. ANDERSON, OF SISSON, CALIFORNIA.

FLUID-OPERATED CONTROLLING MECHANISM.

959,417.
Specification of Letters Patent.
Patented May 24, 1910.

Application filed November 30, 1908. Serial No. 465,024.

*To all whom it may concern:*

Be it known that I, JOHN WESLEY ANDERSON, a citizen of the United States, and a resident of Sisson, in the county of Siskiyou and State of California, have invented a new and Improved Fluid-Operated Controlling Mechanism, of which the following is a full, clear, and exact description.

In Patent Number 860,434, granted to me July 16, 1907, I disclose a cylinder having a piston therein adapted to be moved by the admission of a fluid to either end of the cylinder and connected to mechanism adapted to be operated, the valve through which the fluid enters and leaves being movable longitudinally of the cylinder with the piston. In the specific form illustrated in said patent, the valve is formed by a port rod movable with the piston and a valve plate movable in respect to the port rod.

One object of the present invention is to simplify the construction illustrated in said patent by utilizing the piston rod as a conduit for delivering the liquid to the cylinder and thus eliminating certain of the packings.

An important feature of my present invention involves the forming of the valve by relatively-movable parts of the supply and exhaust conduits, and another important feature involves the locating of this valve within the piston, so that the piston rod also serves as the port rod and no rod packings need be employed save a single packing at each end of the cylinder.

Reference is to be had to the accompanying drawings, forming a part of this specification, in which similar characters of reference indicate corresponding parts in all the figures, and in which—

Figure 1 is a side elevation of a motor vehicle provided with my improved mechanism utilized for steering the vehicle; Fig. 2 is a top plan view of the cylinder and valve-operating means; Fig. 3 is a longitudinal section through the parts shown in Fig. 2; Fig. 4 is a longitudinal section through the valve and taken on a plane at right angles to the plane of Fig. 3; Fig. 5 is a transverse section on the line 5—5 of Fig. 3; and Fig. 6 is a longitudinal section through a modified form of construction in which the valve is disposed outside of the cylinder casing.

My improved mechanism is adapted for use for various different purposes and may be operated by various different fluids. When used for steering a motor vehicle, it is preferably so designed that the operating mechanism of the device serves to indicate the direction in which the vehicle is being driven. In the form of mechanism illustrated in Figs. 2 to 5, inclusive, I employ a cylinder 10, having cylinder heads 11 and a piston 12. The piston is rigidly secured to a piston rod 13, which may extend through a suitable packing 14 in one cylinder head, while a second rod 15, movable in respect to the piston but connected thereto, extends through a suitable packing 16 in the opposite cylinder head. The two rods 13 and 15 are hollow throughout a portion of their length, so that one of the rods may serve for delivering fluid to the interior of the cylinders, while the other rod serves to permit the withdrawal of liquid therefrom. The piston 12 may be of any suitable type, but, as illustrated, it includes a cylindrical body portion 17, fitting the interior of the cylinder and having a web portion 18 serving to separate the chambers at the opposite sides of the piston. The rod 13 extends through the piston and is rigidly secured thereto and serves the triple function of a port rod, a piston rod and a conduit. The portion 19 of the rod, adjacent the piston, is of slightly greater diameter than the remainder of the piston rod and is provided with ports 20 leading to the interior of the cylinder at one side of the piston rod, and ports 21 leading to the interior of the cylinder at the opposite side of the piston.

The rod 15 acts in conjunction with the piston rod, to form a valve for controlling the flow of fluid, and also constitutes a conduit through which fluid may flow. The inner end of the rod 15 is closed and two sets of ports 22 and 23 extend radially through the walls of the rod from the interior to the exterior thereof. These ports are so disposed in respect to the ports 20 and 21, that when the piston rod and the valve rod are in the relative positions indicated in Fig. 3, none of the ports will be in registry. The ports 22 and 23 are farther apart than the ports 20 and 21, so that by moving the valve rod 15 in one direction, the ports 20 and 22 will be brought into registry, while by moving the valve rod in the opposite direction, the ports 21 and 23 will be brought into registry. The valve rod intermediate the ports 22 and 23, is provided with an annular chamber 24, encircling the rod but out of communication with the central passage. This annular chamber communicates at all times with the interior of the piston rod 13 through channels or passages 25 extending from the annular chamber 24 to the end of the valve rod in the outer surface of said valve rod and intermediate the ports 22, as is illustrated particularly in Fig. 4. The length of the annular chamber 24 is such that it normally lies intermediate the ports 20 and 21 and out of communication therewith, but upon the longitudinal movement of the valve rod in respect to the piston, said annular chamber may be brought into communication with either the ports 20 or the ports 21.

The piston rod is connected to the mechanism which it is desired to operate, by my improved device. If the device is to be used in the steering of a motor vehicle, as illustrated in Fig. 1, the piston rod 13 may be connected to a rod 26 leading to a crank arm 27 on one of the steering knuckles. I do not wish to be limited in any way to the particular mechanism illustrated for connecting the piston rod to the parts to be operated thereby.

For moving the valve rod 15, any suitable mechanism may be provided, but preferably a rack bar 28 is mounted to move longitudinally of the cylinder but on the outside thereof, and this rack bar may be rigidly connected to the valve rod 15 by a connecting link or arm 29. An upwardly-extending steering post 30 may have its lower end provided with a segment 31 in engagement with said rack bar, and the segment may be so proportioned in respect to the length of the arm 17 and the other elements of the steering mechanism, so that the angle through which the steering post is rotated, will be equal to the angle of the resulting skewing or turning of the front wheels of the vehicle. The steering post 30 may have a handle 32 at the upper end thereof for rotating said rod, and may have a pointer 33, which, with the segment and other parts in the proportion above indicated, will point in the same direction as the front wheels.

When it is desired to turn the front wheels laterally to change the direction of the vehicle, it is merely necessary to move the handle 32 to the desired extent so that the pointer 33 will indicate the direction in which it is desired to go. The movement of the handle 32 causes a corresponding movement of the rack bar 28 and the valve rod 15.

Assuming that it is desired to move the piston and piston rod from the position indicated in Fig. 3 toward the left-hand end of the cylinder, the valve rod 15 is moved in the same direction until the ports 23 come into registry with the ports 21. At the same time, the ports 20 will come into registry with the annular chamber 24 and will communicate with the interior of the piston rod 13. Fluid under pressure from any suitable source now flows through the rod 15 and ports 23 and 21 into one end of the cylinder, and a corresponding amount of fluid flows from the opposite end of the cylinder through the port 20 and passages 24 and 25 to the rod 13. As soon as the fluid begins to flow, the pressure against the right-hand surface of the piston causes the piston and piston rod to travel toward the left-hand end of the cylinder to an extent exactly equal to the extent of movement of the rod 15, and the ports will immediately close and the parts will become locked in the new position. Thus, the piston follows the valve rod 15 and moves through the same distance as said valve rod but slightly behind the same. Very little power is required to move the valve rod as only the friction of the packings has to be overcome, but the corresponding movement of the piston may exert a very great force dependent upon the pressure of the motive fluid. The valve rod may be moved in either direction in respect to the piston and the latter will automatically follow to the same extent and automatically shut the valve. The relative movement of the piston rod and the valve rod need be only sufficient to uncover the ports 20 and 21, and to prevent accidental derangement of the parts, the valve rod may be arranged to abut against a shoulder within the piston rod to limit this movement in one direction, and a collar 34 may hold in place suitable stops 35 extending into a groove in the valve rod.

As the valve above described is formed of parts of the rods 13 and 15, and this valve is disposed within the cylinder, it is necessary to take apart the entire device in case any of the valve parts become worn. To avoid this objection, I have illustrated in Fig. 6, a modified form, in which the valve is disposed outside of the cylinder and more readily accessible. In this form, I employ substantially the same cylinder 10 and piston 12 above described, but the piston rod 13ª extends through the piston and through both cylinder heads 11. The rod is hollow and subdivided in the plane of the piston by a partition or diaphragm 36. The interior of the piston rod at one side of this partition, communicates with the interior of the cylinder through a port 37, and the piston rod at the opposite side of said partition communicates with the opposite end of the cylinder through a port 38. Outside of the piston rod, I provide a port rod 39, both ends of which are connected to the corresponding ends of the piston rod. The port rod intermediate its ends, carries a valve controlling the flow of fluid through the port rod, and any suitable form of slide valve may be employed, that illustrated being similar to the ordinary D-valve used in simple forms of steam engines. The valve includes a casing 40, having a valve seat at one side thereof, in which there are located ports 41 and 42, communicating with the opposite ends of the port rod 39, and a central port 43 communicating with the exhaust. The valve casing is provided with inlet ports 44, which may communicate with the corresponding ports 41 and 42 upon the longitudinal movement of the valve proper 45. The valve is provided with a chamber in its under side, which communicates with the port 43 and may connect the latter either with the port 41 or 42. The valve is provided with a valve rod 46, by means of which the valve may be moved longitudinally to cause the delivery of fluid through a portion of the port rod and a portion of the piston rod to one end of the cylinder, and the escape of fluid from the opposite end of the cylinder through the other portions of the piston rod and port rod. The valve is carried by the port rod and is movable lengthwise of the cylinder by the movement of the piston. Thus, the operation is substantially the same as that above described, as any longitudinal movement of the valve and valve rod will cause a corresponding movement of the piston and piston rod.

Various changes may be made in the construction of the details of my improved mechanism. For instance, in Fig. 3, I have illustrated the valve rod 15 as being concentric with the piston rod 13 and extending through the opposite end of the cylinder, but it is evident that by slightly varying the proportions, the valve rod may remain concentric with the piston rod but may extend through the piston rod and out of the same end of the cylinder as the latter.

Having thus described my invention, I claim as new and desire to secure by Letters Patent:

1. In combination, a cylinder, a piston, hollow rods extending from said piston through the opposite ends of the cylinder and serving for the delivery and exhaust of fluid to said cylinder at opposite sides of said piston, and a valve movable longitudinally of said cylinder for controlling the flow of fluid through said rods, said valve being adapted to be manually opened and automatically closed by the movement of the piston in the same direction as the valve and to the same extent, whereby the parts will be locked in the position to which they have been moved.

2. In combination, a cylinder, a piston in the cylinder, hollow rods extending from the piston through opposite ends of the cylinder and serving for the delivery and exhaust of fluid to and from the cylinder, and a longitudinally movable valve, manually operated to open the same, the movement of the piston corresponding to that of the valve and serving to automatically close the valve to lock the parts in the position to which they have been moved.

3. In combination, a cylinder, a piston, rods extending from said piston through opposite ends of the cylinder, one of said rods serving for the delivery of fluid to either end of said cylinder and the other of said rods serving for the exhaust of fluid from either end of said cylinder, a valve within said piston for controlling the direction of flow of fluid, and manually operated means for operating the valve to open the same, said valve being automatically closed by the movement of the piston to lock the parts in the position to which they have been moved.

4. In combination, a cylinder, a piston, and two concentric rods, one of said rods serving as an inlet conduit for the delivery of fluid to said cylinder at either side of said piston, and the other of said rods serving for the exhaust of fluid from either end of said cylinder, one of said rods being movable with said piston and the other of said rods being movable in respect to the other rod to control the flow of fluid.

5. In combination, a cylinder, a piston in the cylinder, hollow rods extending from the piston through opposite ends of the cylinder, one of said rods serving for delivery of fluid to the cylinder and the other rod serving for the exhaust of the fluid from the cylinder, one of said rods being fixedly secured to the piston and the other connected to the piston to have movement with respect thereto to control the flow of fluid.

6. In combination, a cylinder, a piston in the cylinder, and hollow rods extending from the piston through opposite ends of the cylinder and serving for the delivery and exhaust of fluid to and from the cylinder, one of the rods extending through the piston and provided with ports on opposite sides of the same, and the other rod having movement in the first named rod and constituting a valve.

7. In combination, a cylinder, a piston in the cylinder, and hollow rods extending from the piston through opposite ends of the cylinder and serving for the delivery and exhaust of fluid to and from the cylinder, one of the rods extending through the piston and provided with ports on opposite sides of the same, and the other rod having limited movement in the first named rod and provided with spaced ports adapted to register with the ports of the first named rod.

8. In combination, a cylinder, a piston in the cylinder, and hollow rods projecting from the piston through opposite ends of the cylinder and serving for the delivery and exhaust of fluid to and from the cylinder, one of the rods projecting through the piston and provided with ports on opposite sides of the same, and the other having limited movement in the first named rod and provided with ports adapted to register with the ports of the first named rod and with an annular chamber and longitudinal passages leading from the chamber.

9. In combination, a cylinder, a piston in the cylinder, hollow rods projecting from the piston through opposite ends of the cylinder and serving for the delivery and exhaust of fluid to and from the cylinder, one of the rods projecting through the piston and having ports on opposite sides of the same, and the other rod constituting a valve working in the first named rod, and manually operated means for operating the rod constituting a valve.

In testimony whereof I have signed my name to this specification in the presence of two subscribing witnesses.

JOHN W. ANDERSON.

Witnesses:
STEPHEN HARPER,
EDWARD J. LAWLESS.